United States Patent
Faigle et al.

(10) Patent No.: US 6,367,838 B1
(45) Date of Patent: Apr. 9, 2002

(54) AIR BAG INFLATION APPARATUS

(75) Inventors: Ernst M. Faigle, Dryden; John M. Gaiser, Washington, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/397,597

(22) Filed: Sep. 16, 1999

(51) Int. Cl.[7] .............................................. B60R 21/26
(52) U.S. Cl. ....................... 280/736; 280/741; 280/738
(58) Field of Search ............................. 280/736, 741, 280/740, 735, 738

(56) References Cited

U.S. PATENT DOCUMENTS

| | | |
|---|---|---|
| 2,850,291 A | 9/1958 | Ziccardi |
| 3,117,424 A | 1/1964 | Hebenstreit |
| 3,450,414 A | 6/1969 | Kobori |
| 3,690,695 A | 9/1972 | Jones, Sr. |
| 3,774,150 A * | 11/1973 | Matsui et al. ................ 340/451 |
| 3,778,084 A * | 12/1973 | Sutherland et al. ......... 280/741 |
| 3,825,278 A * | 7/1974 | Schiesterl et al. .......... 280/735 |
| 4,817,828 A | 4/1989 | Goetz |
| 5,207,450 A * | 5/1993 | Pack, Jr. et al. ............ 280/738 |
| 5,786,543 A | 7/1998 | Staudhammer et al. |

\* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus (10) for inflating an inflatable vehicle occupant protection device (14) includes a container (20) and a refrigerant under pressure in the container (20) in a liquid state. The container (20) is openable to enable the refrigerant to flow out of the container into the inflatable device (14). At least a portion of the refrigerant that flows from the container (20) vaporizes to a gaseous state to help inflate the inflatable device (14). The apparatus (10) includes an aspiration passage (42) enabling aspiration of ambient air into the inflatable device (14) with the refrigerant to help inflate the inflatable device. At least a portion of the refrigerant that flows from the container (20) is located in the inflatable device (14) in a liquid state. That portion of the refrigerant thereafter changes from the liquid state to the gaseous state while in the inflatable device to help maintain the inflatable device in the inflated condition.

6 Claims, 1 Drawing Sheet

AIR BAG INFLATION APPARATUS

BACKGROUND OF THE INVENTION

1. Technical Field

The present invention relates to a vehicle safety apparatus and, in particular, to an apparatus for inflating an inflatable vehicle occupant protection device, such as an air bag.

2. Description of the Prior Art

It is known to inflate a vehicle occupant protection device, such as an air bag, to help protect a vehicle occupant. The air bag is inflated by inflation fluid from an inflator. The air bag is inflated into a position between the vehicle occupant and a portion of the vehicle to help protect the vehicle occupant in the event of a vehicle collision or of a rollover condition of the vehicle.

One type of air bag, known as a side curtain, is inflated between the vehicle occupant and the side structure of the vehicle. It is desirable to maintain a side curtain inflated for a period of seven to ten seconds in order to help protect the vehicle occupant in the event of a rollover condition of the vehicle.

SUMMARY OF THE INVENTION

The present invention is an apparatus for inflating an inflatable vehicle occupant protection device. The apparatus comprises a container and a refrigerant under pressure in the container in a liquid state. The container is openable to enable the refrigerant to flow out of the container into the inflatable device. At least a portion of the refrigerant that flows from the container vaporizes to a gaseous state to help inflate the inflatable device. The apparatus includes an aspiration passage enabling aspiration of ambient air into the inflatable device with the refrigerant to help inflate the inflatable device. At least a portion of the refrigerant that flows from the container is located in the inflatable device in a liquid state, That portion of the refrigerant thereafter changes from the liquid state to the gaseous state while in the inflatable device to help maintain the inflatable device in the inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
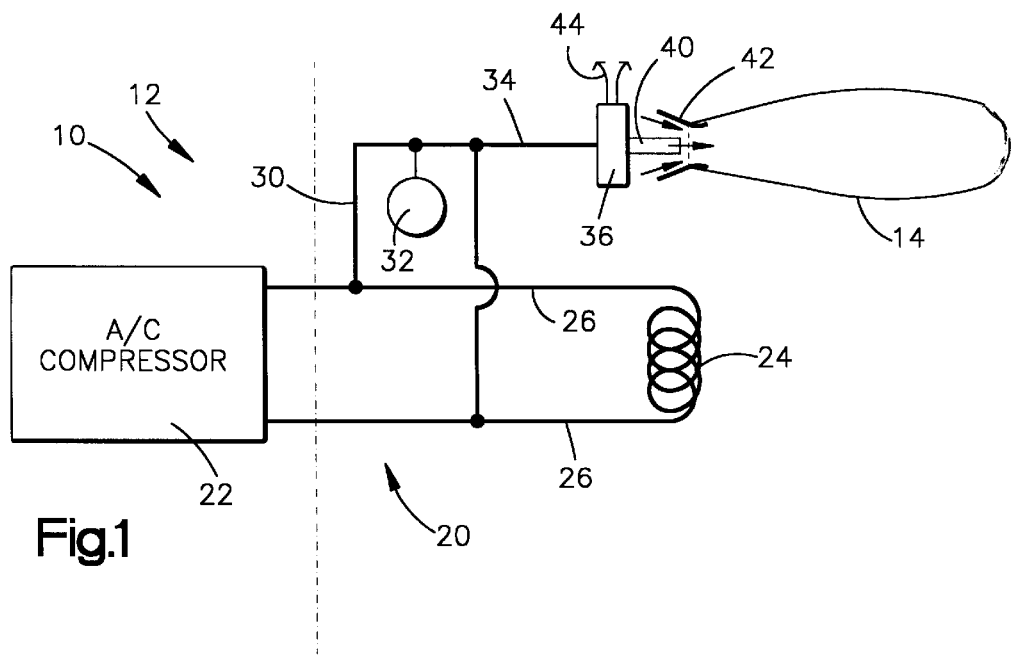
FIG. 1 is a schematic illustration of an inflation apparatus in accordance with the present invention.

The present invention relates to a vehicle safety apparatus and, in particular, to an apparatus for inflating an inflatable vehicle occupant protection device, such as an air bag. As representative of the present invention, FIG. 1 illustrates an apparatus 10 for inflating an inflatable vehicle occupant protection device in the form of a side curtain shown schematically at 14. The side curtain 14 is mounted adjacent the side structure (not shown) of a vehicle 12. The side curtain 14 is movable upon actuation of the apparatus 10 from a deflated and stowed condition (not shown) to an inflated condition as illustrated schematically in FIG. 1. The inflated side curtain 14 helps protect occupants of the vehicle 12 in the event of a side impact to the vehicle or a rollover event of the vehicle.

Shown schematically in FIG. 1 is the vehicle air conditioning system 20. The air conditioning system 20 includes a compressor 22 and an evaporator 24 connected by refrigerant lines 26. The system 20 is filled with a known vehicular air conditioning refrigerant. The refrigerant is preferably 1,1,1,1 TFE (tetrafluoroethylene), but may alternatively be any low boiling point halogen hydrocarbon.

The system 20 includes an external loop 30 to which is connected an accumulator 32. The refrigerant in the external loop 30 is under high pressure and therefore is in a liquid state. The external loop 30 constitutes a container for refrigerant for inflating the side curtain 14. An outlet line 34 from the external loop 30 terminates at an explosive valve and heater assembly 36. A refrigerant outlet nozzle 40 extends from the assembly 36. The refrigerant outlet nozzle 40 extends through or is associated with an air aspiration nozzle 42. The refrigerant outlet nozzle 40 and the air aspiration nozzle 42 open into the interior of the side curtain 14.

The vehicle 12 includes known means (not shown) for sensing a vehicle event for which inflation of the side curtain 14 is desired and for actuating the apparatus 10 in response. When the means senses a vehicle event for which inflation of the side curtain 14 is desired, the means provides an electrical signal over lead wires 44 to the explosive valve and heater assembly 36.

The explosive valve in the assembly 36 is actuated and opens to enable refrigerant under pressure to flow out of the external loop 30 of the system 20 and into the refrigerant outlet nozzle 40. The refrigerant flows through the refrigerant outlet nozzle 40 into the side curtain 14. The refrigerant is heated by the heater of the assembly 36 as it passes the assembly.

A portion of the refrigerant that flows through the refrigerant outlet nozzle 40 vaporizes because of the pressure drop to ambient pressure and because it is heated. Another portion of the refrigerant that flows through the refrigerant outlet nozzle 40 remains in the liquid state. As a result, both gaseous refrigerant and liquid refrigerant are directed into and are, initially, located in the side curtain 14.

The reduced pressure resulting from the refrigerant flowing through the refrigerant outlet nozzle 40 causes ambient air to be aspirated through the aspiration nozzle 42. The aspirated air mixes with the refrigerant as they flow into the side curtain 14. The side curtain 14 inflates fully under the pressure of the gaseous refrigerant and air that are located in the side curtain.

After the initial flow of gaseous refrigerant and air into the side curtain 14, the liquid refrigerant in the side curtain begins to vaporize because of the relatively warm temperature and relatively low pressure in the side curtain. The side curtain 14 is kept inflated by this newly produced gas. The side curtain 14 is maintained inflated for a substantial period of time, for example, up to about seven to ten seconds.

Figure 2:
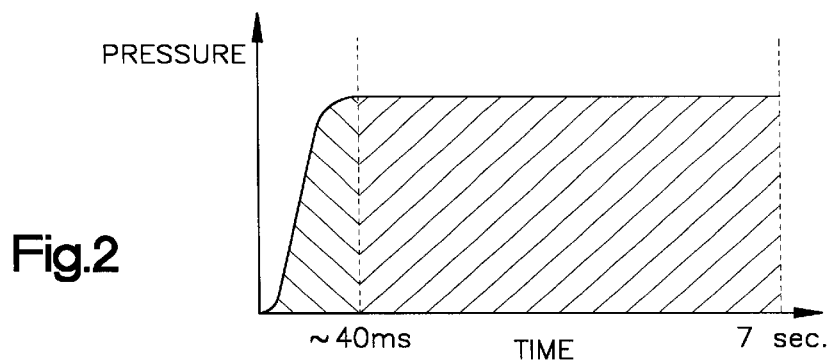
FIG. 2 is a graph that plots tank pressure against time for a tank test of the apparatus of FIG. 1.

FIG. 2 illustrates in a graphical form the results of a tank test of the apparatus 10, in which the output of the apparatus is directed into a non-venting test tank. The curve in FIG. 2 is a graph of the tank pressure against time. The initial flow of air and gaseous refrigerant occurs during the first 30 to 40 milliseconds. During this time period, the pressure in the test tank rises at a first, rapid rate. During the subsequent time period after about 40 milliseconds, the newly formed gaseous refrigerant resulting from vaporization of liquid refrigerant maintains the pressure in the test tank. The pressure in the tank remains substantially the same for this extended period because the tank is closed.

Figure 3:
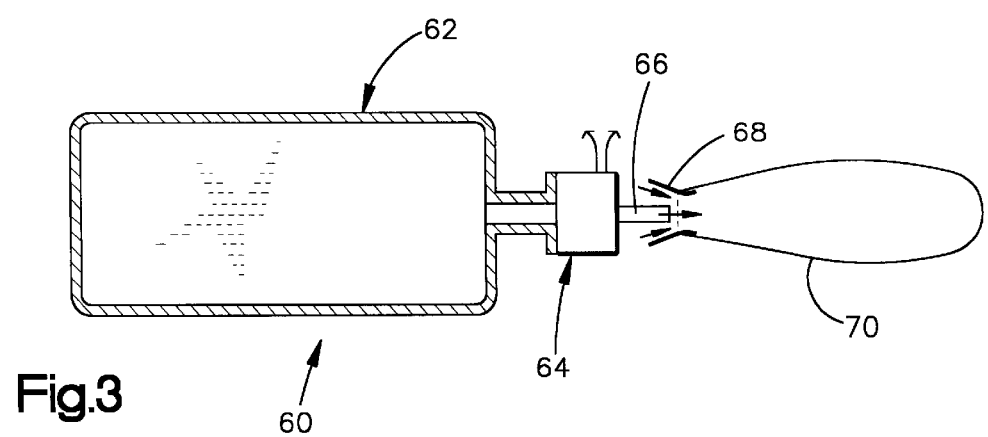
FIG. 3 is a schematic illustration of an inflation apparatus in accordance with a second embodiment of the invention.

FIG. 3 illustrates an apparatus 60 in accordance with a second embodiment of the invention. The apparatus 60 includes a canister 62 containing a quantity of liquid inflation fluid under pressure. The inflation fluid is preferably the same refrigerant as is used in the apparatus 10 (FIG. 1). The canister 62 is not associated with a vehicle air conditioning system. The apparatus 60 also includes an explosive valve and heater assembly 64, and an outlet nozzle 66 and air aspiration nozzle 68 that open into a side curtain 70.

When a sensing means (not shown) senses a vehicle event for which inflation of the side curtain is desired, the explosive valve and heater assembly 64 is actuated and opens to enable refrigerant under pressure to flow out of the canister 62 into the refrigerant outlet nozzle 66. The refrigerant flows through the refrigerant outlet nozzle 66 into the side curtain 70. The subsequent operation of the apparatus 60 is the same as the operation of the apparatus 10 (FIG. 1).

From the above description of the invention, those skilled in the art will perceive improvements, changes and modifications in the invention. For example, an apparatus in accordance with the present invention can also be used for inflating a driver's side air bag, a passenger side air bag, or a side impact air bag which is seat mounted or door mounted. Such improvements, changes and modifications within the skill of the art are intended to be covered by the appended claims.

Having described the invention, we claim:

1. An apparatus for inflating an inflatable vehicle occupant protection device, said apparatus comprising:
   a container;
   a refrigerant under pressure in said container in a liquid state;
   said container being openable to enable said refrigerant to flow out of said container into the inflatable device;
   at least a portion of said refrigerant that flows from said container vaporizing to a gaseous state to help inflate the inflatable device;
   an aspiration passage enabling aspiration of ambient air into the inflatable device with said refrigerant to help inflate the inflatable device, said aspirated air mixing with said refrigerant as said aspirated air and said refrigerant flow into the inflatable device;
   at least a portion of said refrigerant that flows from said container being located in the inflatable device in a liquid state with said aspirated air and thereafter changing from the liquid state to the gaseous state while in the inflatable device to help maintain the inflatable device in the inflated condition.

2. An apparatus as set forth in claim 1 wherein said refrigerant container is a canister not associated with a vehicle air conditioning system.

3. An apparatus for inflating an inflatable vehicle occupant protection device, said apparatus comprising:
   a container, said container being a vehicle air conditioning system;
   a refrigerant under pressure in said container in a liquid state;
   said container being openable to enable said refrigerant to flow out of said container into the inflatable device;
   at least a portion of said refrigerant that flows from said container vaporizing to a gaseous state to help inflate the inflatable device;
   an aspiration passage enabling aspiration of ambient air into the inflatable device with said refrigerant to help inflate the inflatable device;
   at least a portion of said refrigerant that flows from said container being located in the inflatable device in a liquid state and thereafter changing from the liquid state to the gaseous state while in the inflatable device to help maintain the inflatable device in the inflated condition.

4. An apparatus as set forth in claim 3 wherein said refrigerant is tetrafluoroethylene.

5. An apparatus for inflating an inflatable vehicle occupant protection device, said apparatus comprising:
   a container;
   a refrigerant under pressure in said container in a liquid state;
   said container being openable to enable said refrigerant to flow out of said container into the inflatable device;
   at least a portion of said refrigerant that flows from said container vaporizing to a gaseous state to help inflate the inflatable device;
   an aspiration passage enabling aspiration of ambient air into the inflatable device with said refrigerant to help inflate the inflatable device;
   at least a portion of said refrigerant that flows from said container being located in the inflatable device in a liquid state and thereafter changing from the liquid state to the gaseous state while in the inflatable device to help maintain the inflatable device in the inflated condition; and
   a heater being connected with said container for heating refrigerant that flows from said container to help vaporize said refrigerant.

6. An apparatus for inflating an inflatable vehicle occupant protection device, said apparatus comprising:
   a container;
   a refrigerant under pressure in said container in a liquid state;
   said container being openable to enable said refrigerant to flow out of said container into the inflatable device;
   at least a portion of said refrigerant that flows from said container vaporizing to a gaseous state to help inflate the inflatable device;
   an aspiration passage enabling aspiration of ambient air into the inflatable device with said refrigerant to help inflate the inflatable device;
   at least a portion of said refrigerant that flows from said container being located in the inflatable device in a liquid state and thereafter changing from the liquid state to the gaseous state while in the inflatable device to help maintain the inflatable device in the inflated condition;
   further comprising a heater connected with said container for heating refrigerant that flows from said container to help vaporize said refrigerant;
   further comprising a refrigerant outlet nozzle extending from said heater, and wherein said aspiration passage is in an ambient air aspiration nozzle associated with said refrigerant outlet nozzle.

* * * * *